Nov. 1, 1966  A. SAVARY  3,283,047
METHOD FOR MANUFACTURING A HOLLOW PLASTIC ARTICLE
Filed Jan. 13, 1964

Inventor
André Savary
By Stevens, Davis, Miller & Mosher
Attorneys

United States Patent Office 3,283,047
Patented Nov. 1, 1966

3,283,047
METHOD FOR MANUFACTURING A HOLLOW PLASTIC ARTICLE
André Savary, Neuilly-sur-Seine, France, assignor to Kunstsloff-Maschinen A.G., Stansstad, Switzerland
Filed Jan. 13, 1964, Ser. No. 337,417
Claims priority, application France, Jan. 11, 1963, 921,065, Patent 1,372,433
3 Claims. (Cl. 264—98)

The present invention relates to a method for manufacturing a hollow plastic article constituting a bottle integral with a closing device therefor.

It is already known to manufacture bottles or similar hollow articles of plastic by using a blow-molding method.

The main object of the present invention is to improve and further develop such a known blow-molding method so that the articles obtained by the method constitute a bottle integral with a closing device therefor.

The method according to the invention is mainly characterized by the steps of pressure-molding in a heated state one end portion of a length of plastic tubing by means of parts of compression mold laterally engaged therewith until this mold is closed, and by means of a male die advanced through the remaining portion of the plastic tubing, to form a bottle neck unitary with a hollow closing plug and with a tubular extension on the top of his plug, of retracting the male die from the plastic tubing, of laterally engaging parts of a blow mold to strangulate the other end portion of the plastic tubing by means of prong portions of these blow mold parts, to form a closed bottom portion of the bottle, of introducing a blowing tube through said tubular extension and subsequently blow molding a portion of the plastic tubing intermediate to said end portions, thereby forming a body portion of the bottle, and of retracting the blowing tube and disengaging the parts of the compression mold and of the blow mold from the formed article.

In a preferred embodiment of the method according to the invention the compression mold cooperates with the male die to provide between the bottle neck and the closing plug a transition which, when seen in longitudinal section, is reduced to about a point and which is nevertheless tight, such transition being easily destructible, on first use, by exertion of a longitudinal force onto the closing plug.

The accompanying drawings illustrate an embodiment of the invention by way of example.

Figure 1:
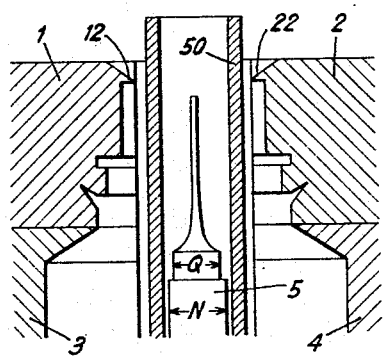
Figure 2:
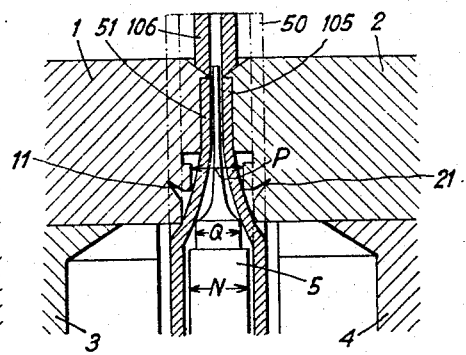
Figure 3:
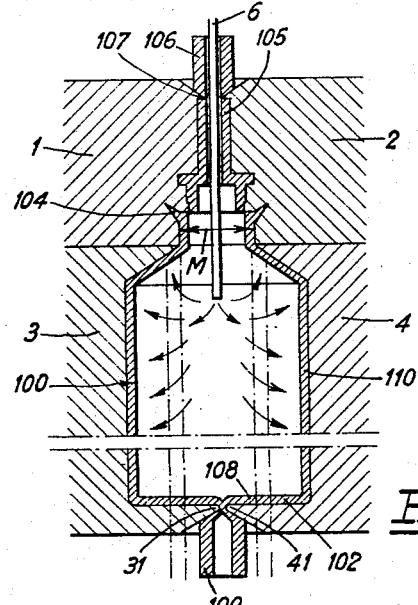
Figure 4:
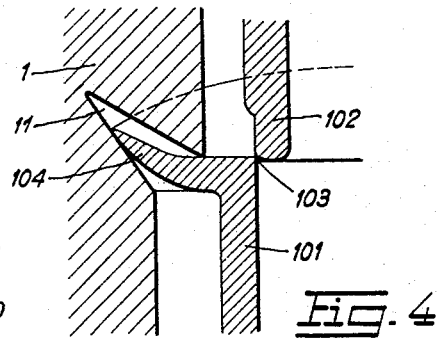
Figure 6:
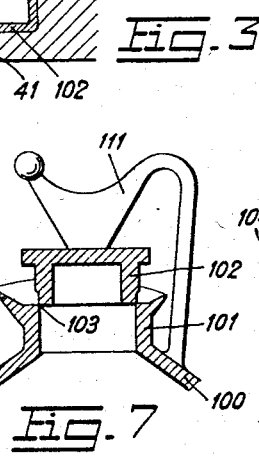
Figure 7:
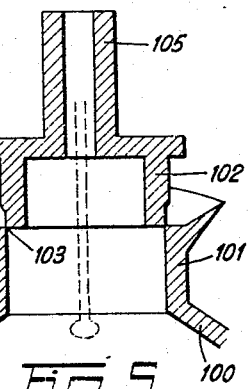
Figure 5:
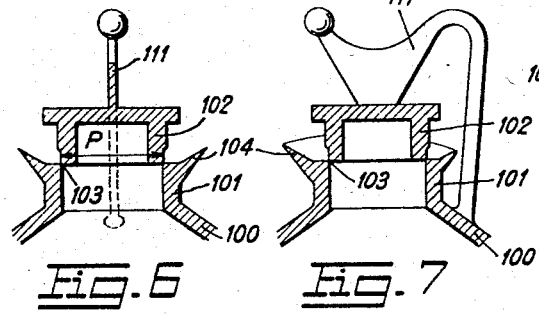

FIG. 1 is a partial vertical section view showing parts of a compression mold and of a blow mold, a male die and also a plastic tubing to be submitted to the operations, all these components being shown in the relative position which they occupy during the first step of the method, FIG. 2 is a section view similar to FIG. 1, which shows the components in the position which they occupy during a second step of the method, FIG. 3 is a similar section view showing the step of blow-molding the body of the bottle, FIG. 4 is a section view of a portion of the compression mold and of the molded article at an enlarged scale to show details of the closing device of the bottle during the step of separating the parts of the compression mold, FIG. 5 is a longitudinal section view of the closing device still having a tubular extension permitting the introduction of a pulverulent or liquid product into the bottle, such extension being later on transformed into a pull lug by means of welding pliers, FIG. 6 is a longitudinal section view similar to FIG. 5, showing the closing device provided with such pulling lug, and FIG. 7 is a longitudinal section along a plane perpendicular to the section plane of FIG. 6.

In the FIGS. 1 to 3 of the drawings the reference numerals 1 and 2 designate the two laterally movable parts of a compression mold and the reference numerals 3 and 4 designate the parts of a blow mold which are laterally movable independently of the parts of the compression mold; there is a glide plane between the parts 1 and 3 and also between the parts 2 and 4. The reference numeral 5 designates a male die which is movable vertically, that is in a direction perpendicular to said glide planes.

On performing the method one starts from a thermoplastic tubing 50 which may for example be previously obtained by extrusion.

In a first step of the method of the invention, the parts 1 and 2 of the compression mold are moved against one another and against the plastic tubing 50 whilst the male die 5 occupies the position shown in FIG. 1. By so doing, an upper portion of the tubing 50 which is strongly heated or still hot if it has just been extruded, is transformed into the transistory shape 51 shown in FIG. 2. Then the male die is moved upwardly to give the transitory shape 51 the shape of the closing device which is represented in FIG. 3. The outer diameter N of the male die should be slightly smaller than the diameter of the plastic tubing 50, and also slightly smaller than the outer diameter M of the bottle neck 101; the diameter Q of the reduced intermediate portion should be equal to the inner diameter P of the compression mold and to the corresponding outer diameter P of the plug 102 of the closing device. The result is that the connection 103 between 101 and 102, when seen in longitudinal section of the closing device, is reduced to substantially a point, as can be seen for example in FIG. 5, such connection being nevertheless perfectly tight. The object of such connection is to attain that in the finished state of the bottle 100 the contents thereof are enclosed tightly and protected against deceitful barter and that nevertheless on the first use the plug 102 may be easily separated from the bottle neck 101 by exerting onto the plug 102 a longitudinal force (pressure or pull) under the action of which the mentioned connection 103 is destructed; afterwards the closing plug 102 may be re-used for closing the bottle since such plug may be easily inserted into the bottle neck 101.

The parts 1 and 2 of the compression mold have groove portions 11 and 21, respectively, opening in the lateral plane where the connection 103 is obtained, such groove portions having approximately conical walls; the plastic of the tubing flows into these groove portions when the male die is moved upwardly. The bottle neck obtains in such groove an elastically yielding, circumferential, spout-forming lip 104 which on the finished article 100 serves also the purpose of protecting the upper rim of the neck 101 and the very weak connection 103 against lateral hits, e.g. during transportation.

The bottom of the closing plug 102 has a tubular extension 105, 106 between which there is a weakening groove 107; the latter is obtained by the action of the lips 12 and 20 of the parts 1 and 2, respectively, of the compression mold. Owing to such weakening groove it is easy to separate later on the portion 106 from the portion 105 of the tubular extension.

After having retracted the male die 5 the parts 3 and 4 of the blow mold are moved towards one another to close the blow mold. These parts have at their lower end protrusions 31 and 41, respectively, which act in strangulating the lower end portion of the plastic tubing 50 to a bottom of bottle somewhat as shown at 108 in FIG. 3, such bottom being provided with a remainder of tubing 109 which later on can easily be broken away.

In a subsequent step a blowing tube 6 is introduced through the extension 106, 105 (FIG. 3) and moves downwardly until its mouth is near the bottom of bottle 108; the blowing tube is then reciprocated in vertical direction so that its mouth is moved within the hollow of the blow mold and the interior of the hot portion of plastic tubing contained in this hollow and simultaneously a hot gas is blown through the tube 6 and its mouth; this is the blow-molding of the body of bottle 110.

Afterwards the throughflow of blowing fluid is interrupted and the blowing tube is retracted and the parts 1, 2 and 3, 4 are retracted to their rest position shown in FIG. 1. During such retraction the spout-forming circumferential lip 104 is temporarily bent downwards by the lower edge of the upper wall of the groove 11, 21, somewhat as shown in FIG. 4.

The bottle now ready for filling has the closing plug 102 integral therewith, as shown in FIG. 5. A pulverulent or liquid product may now be filled in through the tubular extension 105 (106 has previously been broken away); such filling may easily be done at the shop of the manufacturer of that product. This manufacturer may be equipped with welding pliers by means of which he may easily transform the extension 105 into a pull lug, thereby eventually closing the bottle and sealing the bottle contents against deceitful barter.

I claim:

1. A method for manufacturing a hollow plastic article constituting a bottle integral with a closing device therefor, comprising in combination the steps of pressure-molding in a heated state one end portion of a length of plastic tubing by means of parts of compression mold laterally engaged therewith until this mold is closed, and by means of a male die advanced through the remaining portion of the plastic tubing, to form a bottle neck unitary with a hollow closing plug and with a tubular extension on the top of this plug, of retracting the male die from the plastic tubing, of laterally engaging parts of a blow mold to strangulate the other end portion of the plastic tubing by means of prong portions of these blow mold parts, to form a closed bottom portion of the bottle, of introducing a blowing tube through said tubular extension and subsequently blow molding a portion of the plastic tubing intermediate to said portions, thereby forming a body portion of the bottle, and of retracting the blowing tube and disengaging the parts of the compression mold and of the blow mold from the formed article.

2. A method as set out in claim 1, in which the compression mold cooperates with the male die to provide between the bottle neck and the closing plug a transition which, when seen in longitudinal section, is reduced to about a point and which is nevertheless tight, such transition being easily destructible, on first use, by exertion of a longitudinal force onto the closing plug.

3. A method as set out in claim 2, in which the male die is forced to introduce material of the plastic tubing into a circumferential inclined internal groove of the compression mold to provide that outer rim of the bottle neck which surrounds said transition with an approximately conical, spout-forming lip which yields elastically when the parts of the compression mold are separated from the molded article.

References Cited by the Examiner
UNITED STATES PATENTS 2,936,481   5/1960   Wilkalis et al.
3,032,809   5/1962   Willard.

ROBERT F. WHITE, *Primary Examiner.*
A. R. NOE, *Assistant Examiner.*